United States Patent
O'Neill et al.

(10) Patent No.: US 10,096,844 B2
(45) Date of Patent: Oct. 9, 2018

(54) MANIFOLD FOR PLURAL FUEL CELL STACKS

(71) Applicant: Hamilton Sundstrand Corporation, Charlotte, NC (US)

(72) Inventors: Jonathan Daniel O'Neill, Manchester, CT (US); Guillaume Michael Kurczko Brousseau, Woodstock, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1078 days.

(21) Appl. No.: 14/171,797

(22) Filed: Feb. 4, 2014

(65) Prior Publication Data

US 2015/0099205 A1    Apr. 9, 2015

Related U.S. Application Data

(60) Provisional application No. 61/886,107, filed on Oct. 3, 2013.

(51) Int. Cl.
```
H01M 8/24       (2016.01)
H01M 8/02       (2016.01)
H01M 8/0286     (2016.01)
H01M 8/2404     (2016.01)
H01M 8/2484     (2016.01)
```
(Continued)

(52) U.S. Cl.
CPC ....... *H01M 8/0286* (2013.01); *H01M 8/0271* (2013.01); *H01M 8/04276* (2013.01); *H01M 8/2404* (2016.02); *H01M 8/248* (2013.01); *H01M 8/249* (2013.01); *H01M 8/2415* (2013.01); *H01M 8/2465* (2013.01);
(Continued)

(58) Field of Classification Search
CPC ........ H01M 8/02–8/0297; H01M 8/24–8/2495
See application file for complete search history.

(56) References Cited

U.S. PATENT DOCUMENTS 3,994,748 A * 11/1976 Kunz ..................... H01M 8/00
                                                 429/458
4,129,685 A    12/1978 Damiano
(Continued)

FOREIGN PATENT DOCUMENTS

JP    H05-266910 A    10/1993
WO    03083982 A2    10/2003

OTHER PUBLICATIONS

"Advanced Chemical Hydride-Based Fuel Cell Systems for Portable Military Applications", Dr. Paul Osenar, Protonex Technology Corporation, Nov. 1, 2006.
(Continued)

*Primary Examiner* — Jonathan Crepeau
*Assistant Examiner* — Jacob Buchanan
(74) *Attorney, Agent, or Firm* — Carlson, Gaskey & Olds, P.C.

(57) ABSTRACT

An assembly has a plurality of fuel cell stacks with at least one wall. At least one manifold portion is provided outwardly of the at least one wall of each of the fuel cell stacks. The at least one manifold portion for a pair of the plurality of fuel cell stacks is on facing surfaces with an intermediate wall between the at least one of the manifold portions on the pair of the plurality of fuel cell stacks. A method of forming an assembly of a plurality of fuel cell stacks is also disclosed.

13 Claims, 4 Drawing Sheets

(51) Int. Cl.
*H01M 8/2465* (2016.01)
*H01M 8/0271* (2016.01)
*H01M 8/241* (2016.01)
*H01M 8/248* (2016.01)
*H01M 8/249* (2016.01)
*H01M 8/04276* (2016.01)
*H01M 8/0284* (2016.01)

(52) U.S. Cl.
CPC ........ *H01M 8/2484* (2016.02); *H01M 8/0284* (2013.01); *H01M 8/241* (2013.01)

(56) References Cited

U.S. PATENT DOCUMENTS

| | | | | |
|---|---|---|---|---|
| 4,212,929 | A | * | 7/1980 | Grevstad .............. H01M 8/2485 429/185 |
| 4,301,222 | A | | 11/1981 | Emanuelson et al. |
| 4,623,596 | A | * | 11/1986 | Kamoshita .......... H01M 8/2485 429/437 |
| 5,100,744 | A | * | 3/1992 | Harashima ........ H01M 8/04089 429/416 |
| 5,238,754 | A | * | 8/1993 | Yasuo ................. H01M 8/0247 429/434 |
| 5,252,409 | A | * | 10/1993 | Akagi ................. H01M 8/2425 429/456 |
| 5,480,738 | A | * | 1/1996 | Elangovan .......... H01M 8/0625 429/423 |
| 5,750,280 | A | * | 5/1998 | Akagi ................. H01M 8/2425 429/452 |
| 5,945,232 | A | | 8/1999 | Ernst et al. |
| 6,110,612 | A | * | 8/2000 | Walsh .................. H01M 8/247 429/100 |
| 6,492,053 | B1 | * | 12/2002 | Donelson .............. H01M 8/242 429/458 |
| 6,764,787 | B2 | * | 7/2004 | Grasso ................ H01M 8/0271 165/166 |
| 6,946,210 | B2 | | 9/2005 | Osenar et al. |
| 7,052,796 | B2 | | 5/2006 | Sabin et al. |
| 7,306,864 | B2 | | 12/2007 | Osenar et al. |
| 7,659,022 | B2 | | 2/2010 | Valensa et al. |
| 8,026,013 | B2 | | 9/2011 | Valensa et al. |
| 8,124,292 | B2 | | 2/2012 | Vitella et al. |
| 8,372,559 | B2 | | 2/2013 | Andreas-Schott et al. |
| 2004/0086758 | A1 | * | 5/2004 | Vuk .................... H01M 8/2415 429/428 |
| 2007/0134531 | A1 | | 6/2007 | Kimura et al. |
| 2007/0238004 | A1 | | 10/2007 | Osenar et al. |
| 2010/0015491 | A1 | | 1/2010 | Yamanis |
| 2011/0076588 | A1 | * | 3/2011 | Yamaura .......... H01M 8/04067 429/470 |
| 2011/0269052 | A1 | | 11/2011 | Haltiner, Jr. et al. |
| 2011/0318666 | A1 | * | 12/2011 | Patterson, Jr. ...... H01M 8/0271 429/480 |

OTHER PUBLICATIONS

"PEM Technology" at www.protonex.com/technology/pem.aspx (2013).
Pozio, A. et al: "Membrane electrode gasket assembly (MEGA) technology for polymer electrolyte fuel cells", Journal of Power Sources, Elsevier SA, CH, vol. 112, No. 2, Nov. 14, 2002, pp. 491-496, XP004391011, ISSN: 0378-7753, DOI: 10.1016/50378-7753(02)00458-5.
European Search Report for European Patent Application No. 14187400.8 dated Jan. 8, 2015.

* cited by examiner

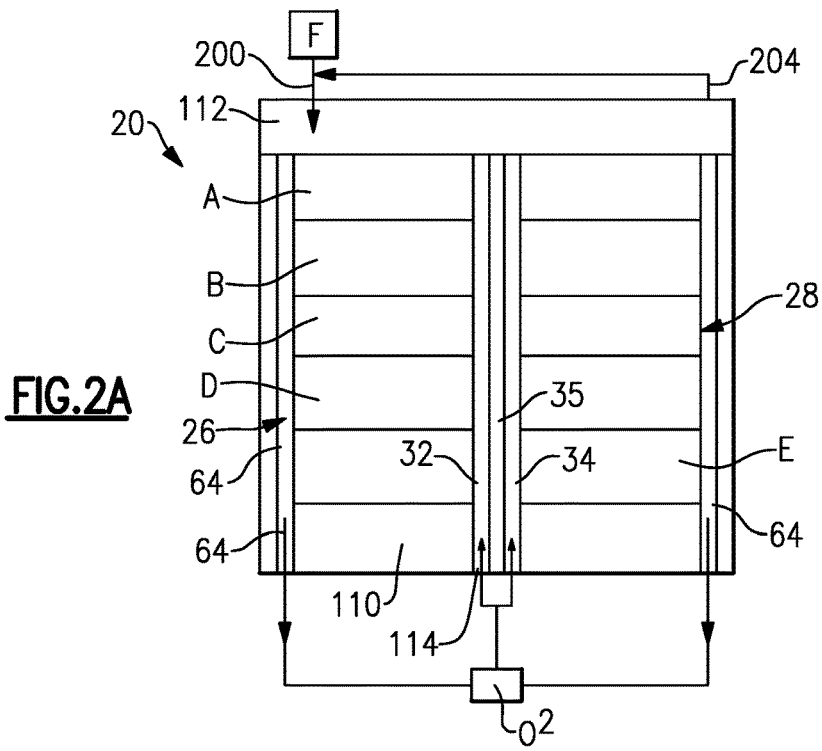
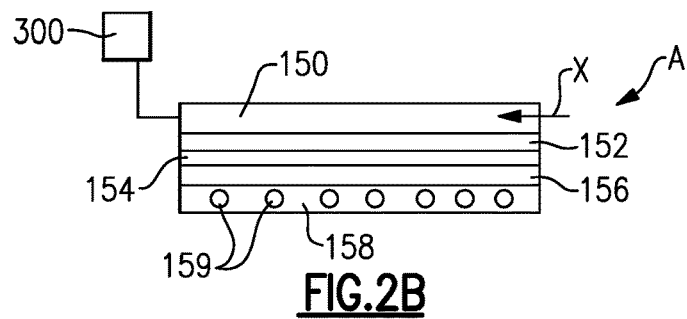
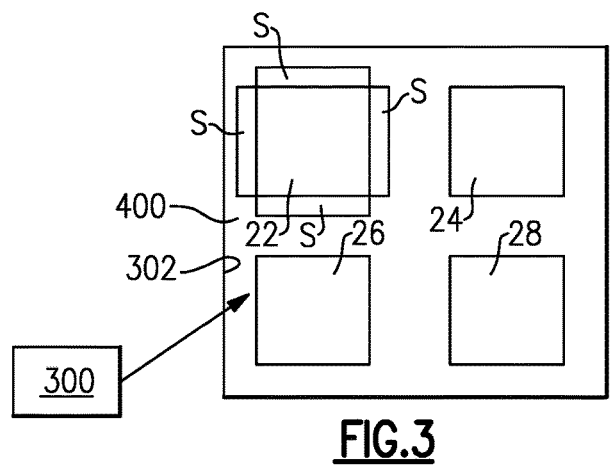

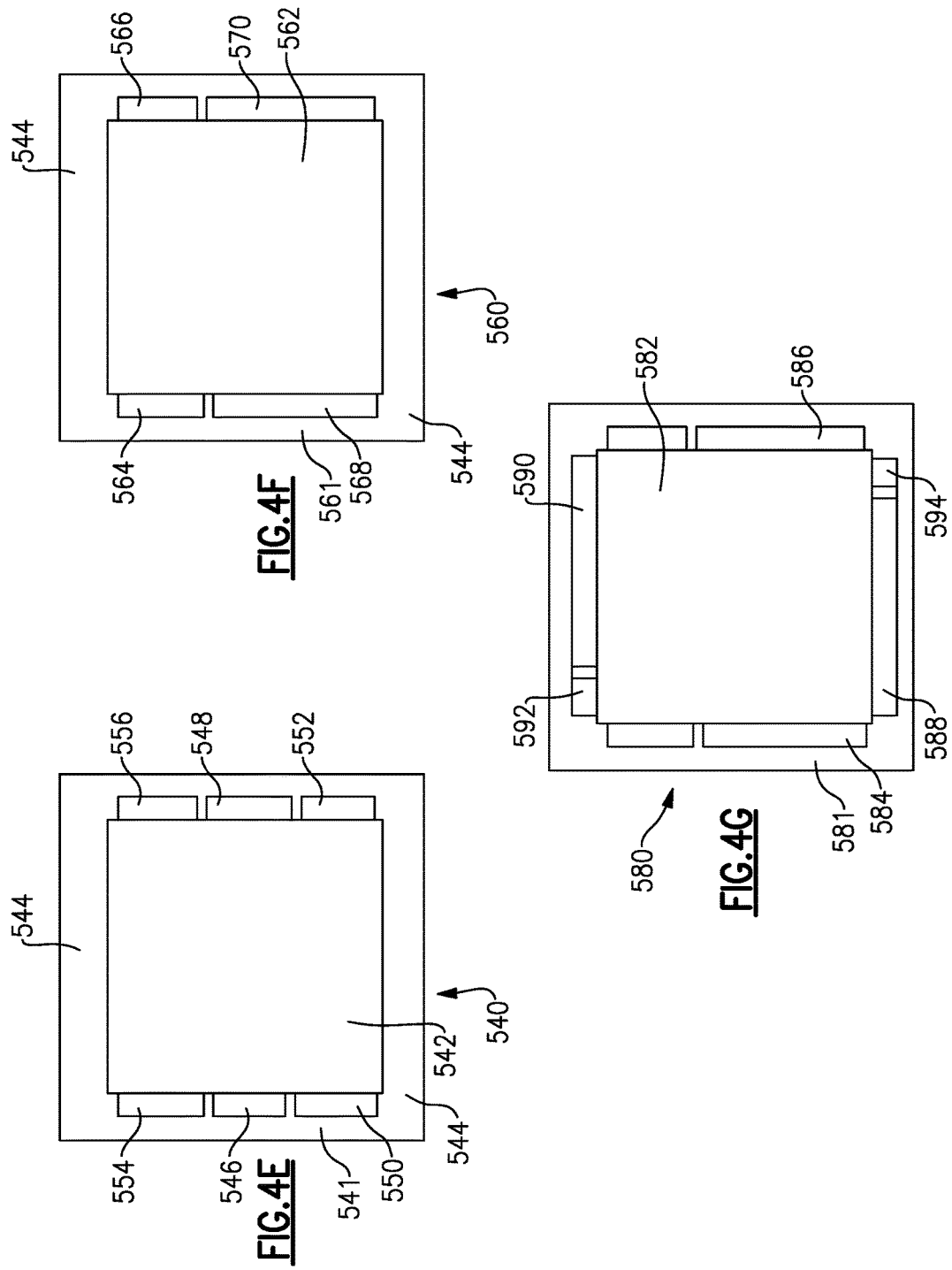

MANIFOLD FOR PLURAL FUEL CELL STACKS

RELATED APPLICATION

This application claims priority to U.S. Provisional Application No. 61/886,107, filed Oct. 3, 2013.

BACKGROUND

This application relates to an assembly that includes a plurality of fuel cell stacks and a common manifold provided for the stacks.

Fuel cells are known and, typically, include an anode receiving a supply of a fuel. The fuel may be hydrogen ($H_2$) in one example. The anode is spaced by a membrane from a cathode. The cathode receives a supply of a gas containing oxygen. The gas may be oxygen or air in examples. The fuel passes across the anode, the oxygen passes across the cathode, and a reaction takes place that generates electrical energy.

Fuel cells are often utilized in assemblies called stacks. In addition, there may be a plurality of stacks.

In the prior art, a manifold for supplying fuel and a manifold for supplying the oxygen containing gas have been separately provided to each of the fuel cells in each of the plurality of stacks.

Moreover, both the ports for the fuel and the ports for the oxygen containing gas may be formed in a single pressure plate.

SUMMARY

An assembly has a plurality of fuel cell stacks with at least one wall. At least one manifold portion is provided outwardly of the at least one wall of each of the fuel cell stacks. The at least one manifold portion for a pair of the plurality of fuel cell stacks is on facing surfaces with an intermediate wall between the at least one of the manifold portions on the pair of the plurality of fuel cell stacks. A method of forming an assembly of a plurality of fuel cell stacks is also disclosed.

These and other features may be best understood from the following drawings and specification.

BRIEF DESCRIPTION OF THE DRAWINGS

FIG. 2A schematically shows a cross-sectional view through the FIG. 1 assembly.

FIG. 2B shows another feature.

FIG. 3 shows a mold for forming the FIG. 1 assembly.

FIG. 4E shows a fifth possible manifold arrangement.

FIG. 4F shows a sixth possible manifold arrangement.

FIG. 4G shows a seventh possible manifold arrangement.

DETAILED DESCRIPTION

Figure 1:
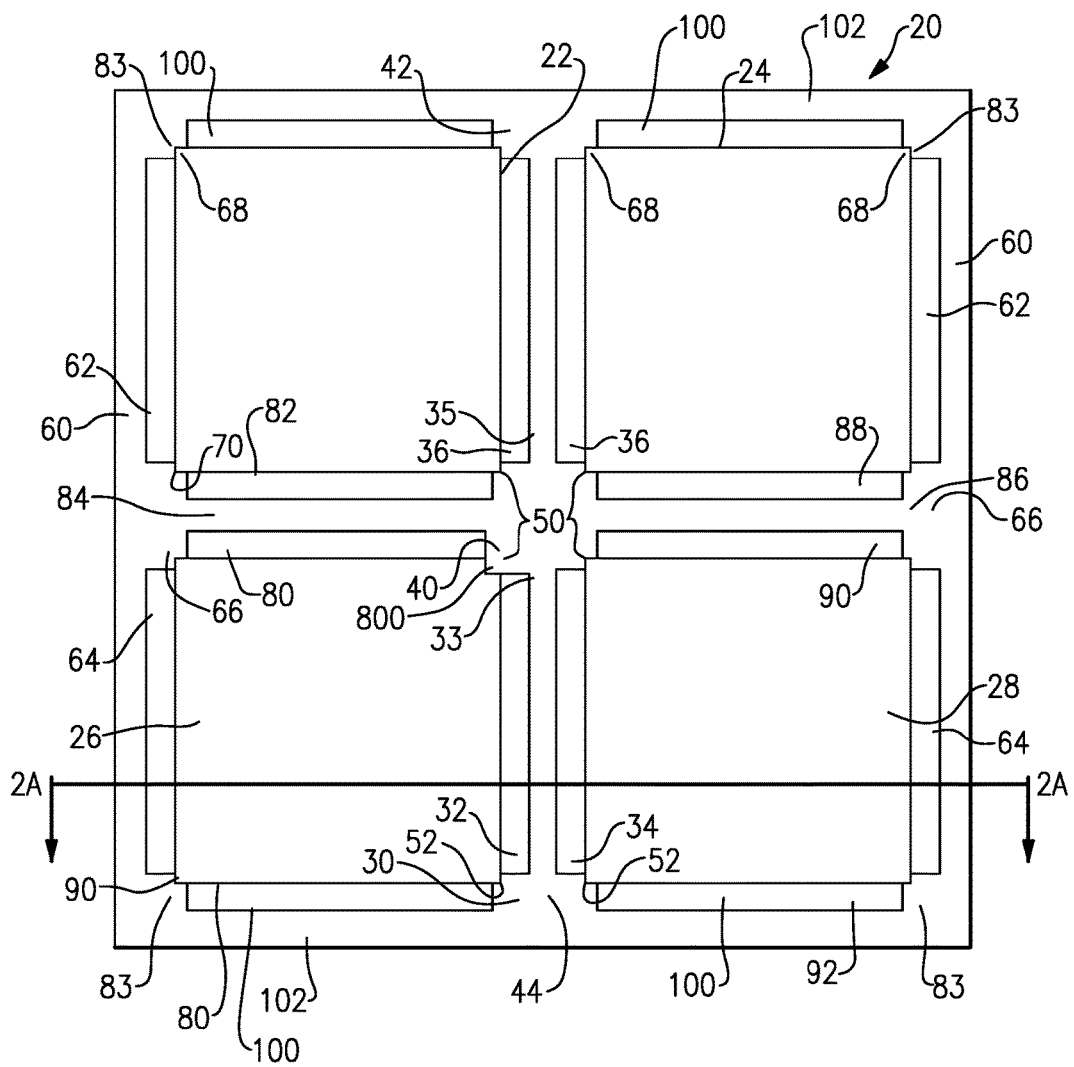
FIG. 1 schematically shows an assembly of a plurality of fuel cell stacks.

An assembly 20, shown in FIG. 1, includes a plurality of fuel cell stacks 22, 24, 26 and 28. A common manifold 30 is molded about the plurality of stacks 22, 24, 26 and 28. As shown, an oxygen manifold portion 32 is formed on one inner face of the stack 26 and a second oxygen manifold portion 34 is formed on an inner face of the stack 28. The faces face each other. A common wall 33 separates the manifold portions 32 and 34. Similarly, manifold portions 36 are separated by a common wall 35 on inner faces of the stacks 22 and 24.

Outer oxygen manifold portions 62 and 64 are formed on outer faces of the stacks 22, 24, 26 and 28. An outer wall 60 is outward of the manifold portions 62 and 64. End separators 66 separate the manifold portions 62 and 64 and further separate the oxygen manifolds 62 and 64 from fuel manifold portions 88 and 90. The end separator 66 can be seen to have corners 68 and 70 at which they merge into the stacks 22, 24, 26 and 28. This provides a seal at a corner of the stacks intermediate manifold portions, for example portions 62 and 82.

The concept of providing edge seals for each cell is known from the patent disclosed below. The manifold material enters cells from the corners of cells, impregnates edges of the fuel cells, bonds layers of the stacks together, and seals the cells from leaking out of the edges. However, this is known with a single stack, and not a plurality as disclosed above.

A central fuel manifold is shown with portions 80 and 82 and common separator wall 84, manifold portions 88 and 90, and separator wall 86.

Again, each of the stacks 22, 24, 26 and 28 have an inner face that provides one wall of the manifold portions 80, 82, 88 and 90. There are outer fuel manifold portions 100 on outer faces of the stacks 22, 24, 26 and 28 and inwardly of an outer wall 102.

A central separator 40 merges with the corners 50 of each stack 22, 24, 26 and 28, to provide a seal. Similar corner sealing occurs at corner separators 83 and intermediate separators 42 and 44 and at corners 52 and 68. As shown schematically at 800, a portion of the resin will merge into the corners, and between adjacent fuel cells in the stacks. While this is shown at only one corner 50, it should be appreciated that similar sealing would occur at each corner of each fuel cell stack, and between each adjacent fuel cell in the stack.

As resin merges into the corners of each cell, it may travel along the edges of each cell to seal the edges of each cell where appropriate. For example, starting at 800, resin could enter a channel or step in each cell in stack 26. This channel for resin would run parallel to and close to the cell edge between stack 26 and manifold portion 32, allowing resin to seal the edge of the fuel diffusion layers but not the oxygen flowfield. Likewise, another channel for resin would run parallel to and close to the cell edge between stack 26 and manifold portion 80, allowing resin to seal the edge of the oxygen diffusion layers but not the fuel flowfield. The manifold 30 can be injection molded or, otherwise, molded about the stacks 22, 24, 26 and 28. A one piece manifold can, thus, provide a supply manifold for fuel, a return manifold for used fuel, a supply manifold for gas containing oxygen, and a return manifold for the gas containing oxygen.

As shown in FIG. 2A, a supply line 114 may supply the oxygen containing gas from a tank $O_2$ to the assembly 20. This may pass through a pressure plate 110, which is atop one of the set of fuel cells A, B, C, D, E in a stack. The "adjacent fuel cells" as mentioned above, would be the facing ones of the fuel cells A-E. Thus, in practice, there may be resin between the fuel cells A-E at their corners or even along their edges, as disclosed above. While five fuel cells A-E are shown in the stacks 26 and 28, it should be understood that a much larger number may typically be provided. An opposed pressure plate 112 includes a fuel supply 200 from a fuel tank F. The supply 200 is shown schematically as is a return 204.

While the oxygen containing gas inlet or supply line 114 is shown at a central location between the stacks 26 and 28, it should be understood that the supply could be at the outer face manifold portions 62 rather than the inner face manifold portions 32/34. Moreover, it is possible for the supply to be at the inner faces of a pair of stacks, for example 22 and 24, and at the outer faces of the other stacks 26 and 28.

While the fuel supply 200 and return 204 are shown schematically in FIG. 2A, a worker of ordinary skill in the art would recognize how to supply the fuel through the pressure plate 112 given the arrangement of fuel manifolds as shown in FIG. 1.

The arrangement of the manifold portions as shown in FIG. 1 would be best facilitated by the oxygen containing gas flowing in a direction generally perpendicular to that of the direction that fuel passes.

FIG. 2B shows a fuel cell A. As known, a supply passage layer 150 may supply fuel across an anode 152. The anode 152 is separated by a membrane 154 from a cathode 156.

A plurality of passages 159 for oxygen containing gas are shown in a layer 158. As known, fuel passes along a direction X across the anode 152 while oxygen containing gas passes (passages in layer 158) across the cathode 156 and a reaction takes place across the membrane. Electricity is generated and used for a use 300 shown schematically in FIG. 2B.

The use of the single molded manifold simplifies the arrangement of an assembly of a plurality of stacks of fuel cells. While four stacks are shown in FIG. 1, other numbers of stacks may be utilized. As an example, as few as two stacks would benefit from this disclosure. However, greater numbers of stacks can be provided and a worker of ordinary skill in the art would recognize how to provide a central wall separating paired manifolds on inner faces and on opposed faces should there be a greater number of stacks.

FIG. 3 schematically shows a mold 302. The stacks 22, 24, 26 and 28 are placed in mold 302. Blocking structures S are placed at outer faces of the stacks 22 and similar structures would be placed adjacent stacks 24, 26 and 28. The blocking structures may be part of the mold and worker of ordinary skill in the molding art would recognize how to provide such structure. On the other hand, corners between the blocking structures would provide access between an interior of the mold 302 and corners of the stacks 22, 24, 26 and 28. It should be understood that FIG. 3 is extremely schematic. Thus, the blocking structures S would actually have a more complex shape, such that they would provide the manifold portions as illustrated in FIG. 1, but also allow the resin to flow to form the several separator portions. An appropriate material, such as an injection moldable resin 300, is injected into the mold 302 and fills the space 400. When the resin cures, a manifold, such as manifold 30, would remain.

Any number of molding techniques may be utilized, and may also be utilized to form the inlet and outlet port structures as illustrated schematically in FIG. 2A. As one example, a molding technique as disclosed by Protonex Technology Corporation, and identified for example in U.S. Pat. No. 7,306,864 may be utilized to form the disclosed manifold. This molding technique has been utilized in the past to form a manifold around a single fuel cell, however, when taken in combination with this disclosure, a worker of ordinary skill in the art would recognize how to form the disclosed manifold.

While the stacks are shown as being squares, other shapes and even non-rectangular shapes may benefit from this disclosure.

The stacks, 22, 24, 26, and 28 all are shown as squares, and having four sides. As mentioned, other shapes may come within the scoped of this disclosure. Thus, this application claims that there are "at least four walls" of each of the plurality of fuel cell stacks. This does not require a straight edge, but simply means a boundary.

The Figures to date disclose a first arrangement of the manifold portions, and flow directions across the fuel cell stacks. FIGS. 4A-4G shows a number of possible alternative configurations. Any one of these alternative configurations can be used in combination with others to arrive at the complete assembly.

Figure 4A:
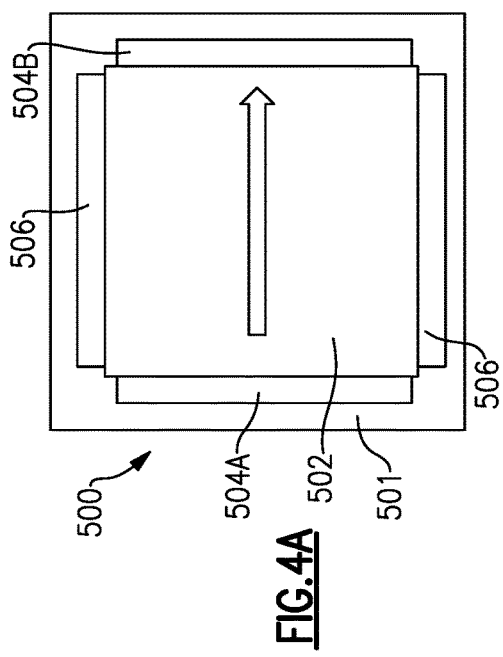
FIG. 4A shows a first possible manifold arrangement.

As an example, FIG. 4A shows an assembly 500 where a fuel cell stack 502 has a manifold wall 501, manifold portions 506, which may be the oxygen containing air manifolds, and a "one-pass" fuel flow from an inlet manifold portion 504A to an outlet manifold portion 504B. This is essentially the flow direction as disclosed in FIG. 1.

Figure 4B:
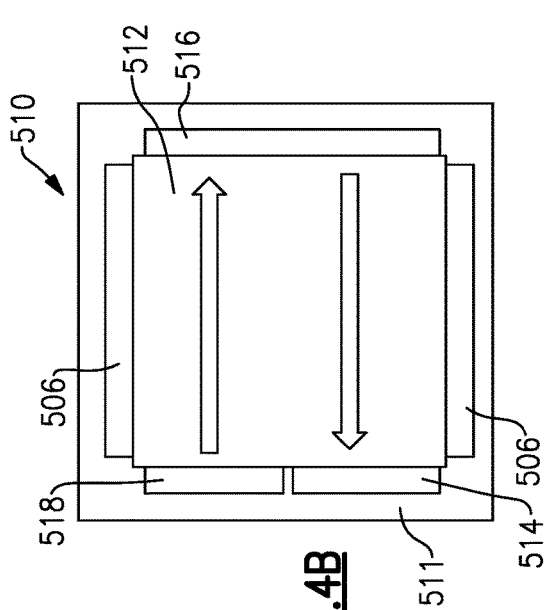
FIG. 4B shows a second possible manifold arrangement.

FIG. 4B shows an alternative 510 wherein a fuel cell stack 512 has manifold portions 506 which may be the oxygen containing air supply manifold portion, and may be a "one-pass" as disclosed in FIG. 4A. However, the fuel supply now includes a fuel inlet manifold portion 518, a fuel turn manifold portion 516, and a fuel exit manifold portion 514. This manifold thus would allow fuel to flow into the inlet 518, across the fuel cells to the turn manifold portion 516, and then back to the exit manifold portion 514. Again, there is an outer wall 511.

Figure 4C:
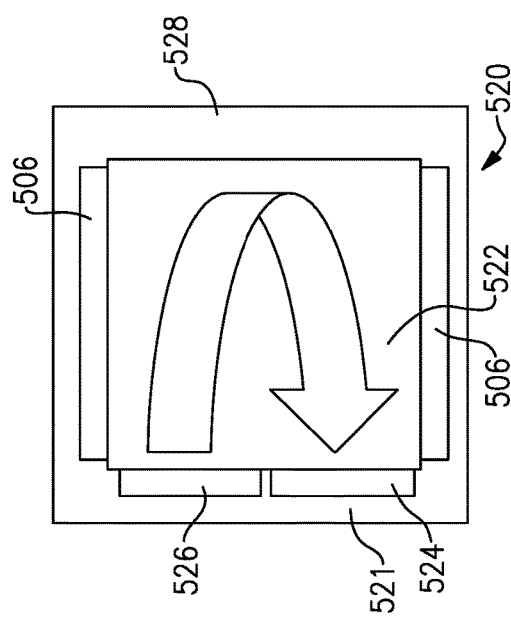
FIG. 4C shows a third possible manifold arrangement.

FIG. 4C shows an assembly 520 having a fuel cell stack 522, again having manifold portions 506. A fuel inlet manifold portion 526 is formed on one wall of the fuel cell stack 22, and the fuel flows across the stack 522, and hits an opposed wall 528, and then is returned to a fuel exit manifold portion 524, which is on the same side as the fuel inlet manifold portion 526. Again, an outer wall 521 is identified.

Figure 4D:
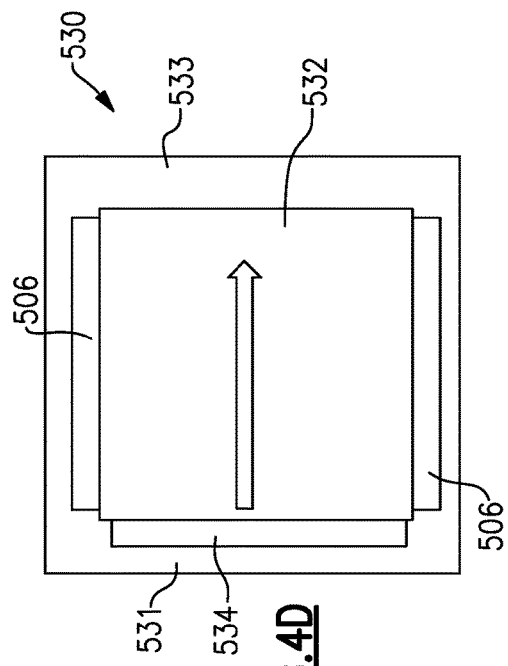
FIG. 4D shows a fourth possible manifold arrangement.

An assembly 530 having a fuel cell stack 532 is illustrated in FIG. 4D. In this embodiment, there are again manifold portions 506. There is a single fuel inlet manifold 534, and the fuel flows across the stack 532 to an opposed wall 533. There is no exit manifold, and this embodiment envisions a 100% consumption of the fuel.

FIG. 4E shows an assembly 540 having a fuel cell stack 542. There are seals 544 at outer walls of the stack 542. There are three paired manifold portions in this embodiment. As an example, there is a fuel inlet manifold portion 550, a fuel outlet manifold portion 552, an air inlet manifold portion 546, and an air outlet manifold portion 548. In addition, there is now a coolant inlet manifold portion 554 leading to a coolant exit manifold portion 556. Here again there is an outer wall 541.

FIG. 4F shows an assembly 560, again having the outer sealing walls 544, and coolant manifold portions 564 and 566. There is a single fuel manifold 568 and a single air manifold 570. The manifold portions 568 and 570 may operate like the "no exit" embodiment of FIG. 4D, or one of the return embodiments such as shown in FIG. 4B or 4C. Again, an outer wall 561 is illustrated. Fuel cell stack 562 is also shown.

FIGS. 4C-4F could be said to show at least one sealing wall 528, 533 or 544 on one wall, with a portion of the manifold associated with the sealing wall not including any manifold portion.

FIG. 4G shows yet another assembly 580 having a fuel manifold inlet portion 584, a fuel exit manifold portion 586, an oxygen containing air inlet manifold portion 588, an exit manifold portion 590, and a coolant inlet portion 594, and a coolant exit manifold portion 592. Here again there is an outer wall 581. Fuel cell stack 582 is also shown.

What is common with each of the embodiments 4A-4G is that one of the walls, which may be wall 501, 511, 521, 531, 541, 561, or 581, would be a shared wall with another assembly from an adjacent fuel cell stack. While these numbered walls are illustrated, it could be any of the walls placed outwardly of a manifold portion in the embodiments of FIG. 4A-4G, which is an intermediate wall shared with another fuel cell stack.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An assembly of a plurality of fuel cell stacks, comprising:
   a plurality of fuel cell stacks each having at least one wall;
   a plurality of manifold portions, with at least one manifold portion provided outwardly of said at least one wall of each of said plurality of fuel cell stacks and with said at least one wall forming a portion of said at least one manifold portion; and
   an adjacent pair of fuel cell stacks in said plurality fuel cell stacks each having at least one manifold portion on facing surfaces of said adjacent pair of fuel cell stacks, with an intermediate wall forming a portion of each of said at least one manifold portions on facing surfaces of said adjacent pair of fuel cell stacks, said intermediate wall merging into a separator, with said separator including resin forming edge seals within said plurality of fuel cell stacks.

2. The assembly as set forth in claim 1, wherein there are separators at corners of each of said plurality of fuel cell stacks and between adjacent ones of said manifold portions.

3. The assembly as set forth in claim 1, wherein there are at least three of said fuel cell stacks.

4. The assembly as set forth in claim 3, wherein at least one of said three fuel cell stacks having said facing surfaces with an intermediate wall between a first of said at least one manifold portion with a second of said at least three fuel cell stacks, and another of said at least one manifold portion being on another facing surface, with another intermediate wall between a third of said fuel cell stacks.

5. The assembly as set forth in claim 4, wherein there are at least four of said fuel cell stacks.

6. The assembly as set forth in claim 5, wherein each of said at least four of said fuel cell stacks having a set of said at least two facing surfaces with an associated one of said manifold portions and said intermediate wall.

7. The assembly as set forth in claim 1, wherein pressure plates are placed at ends of said assembly and there being a fuel supply line, a fuel return line, an oxygen containing gas supply, and an oxygen containing gas return line extending through both said pressure plates.

8. The assembly as set forth in claim 1, wherein fuel flows across fuel cells within said fuel cell stacks in a flow direction that is generally perpendicular to a flow direction of the oxygen containing gas across said fuel cell.

9. The assembly as set forth in claim 1, wherein said plurality of fuel cell stacks each having at least four walls, and there being at least four of said manifold portions, with one of said manifold portions being a fuel supply manifold, one of said manifold portions being a fuel return manifold, one of said manifold portions being a supply for an oxygen containing gas, and a fourth of said manifold portions being a return manifold for the oxygen containing gas.

10. The assembly as set forth in claim 1, wherein at least one of said plurality of fuel cell stacks has at least two walls, with at least three manifold portions, provided outwardly of said at least two walls, with an inlet and exit manifold portion being provided outwardly of one of said walls, and a turn manifold provided at an opposed one of said walls.

11. The assembly as set forth in claim 1, wherein at least one of said plurality of fuel cell stacks including at least three walls, with said at least three walls together providing a fuel inlet manifold portion, a fuel outlet manifold portion, and an oxygen containing gas inlet manifold and an oxygen containing gas exit manifold portion.

12. The assembly as set forth in claim 1, wherein said plurality of manifold portions also providing a coolant inlet and outlet for at least one of said plurality of fuel cell stacks.

13. The assembly as set forth in claim 1, wherein said plurality of manifold portions are formed in a single molded structure.

* * * * *